Nov. 25, 1930.  F. W. MANNING  1,782,785
PROCESS OF MAKING FILTER PAPER AND FILTER FABRICS
Original Filed Nov. 29, 1927
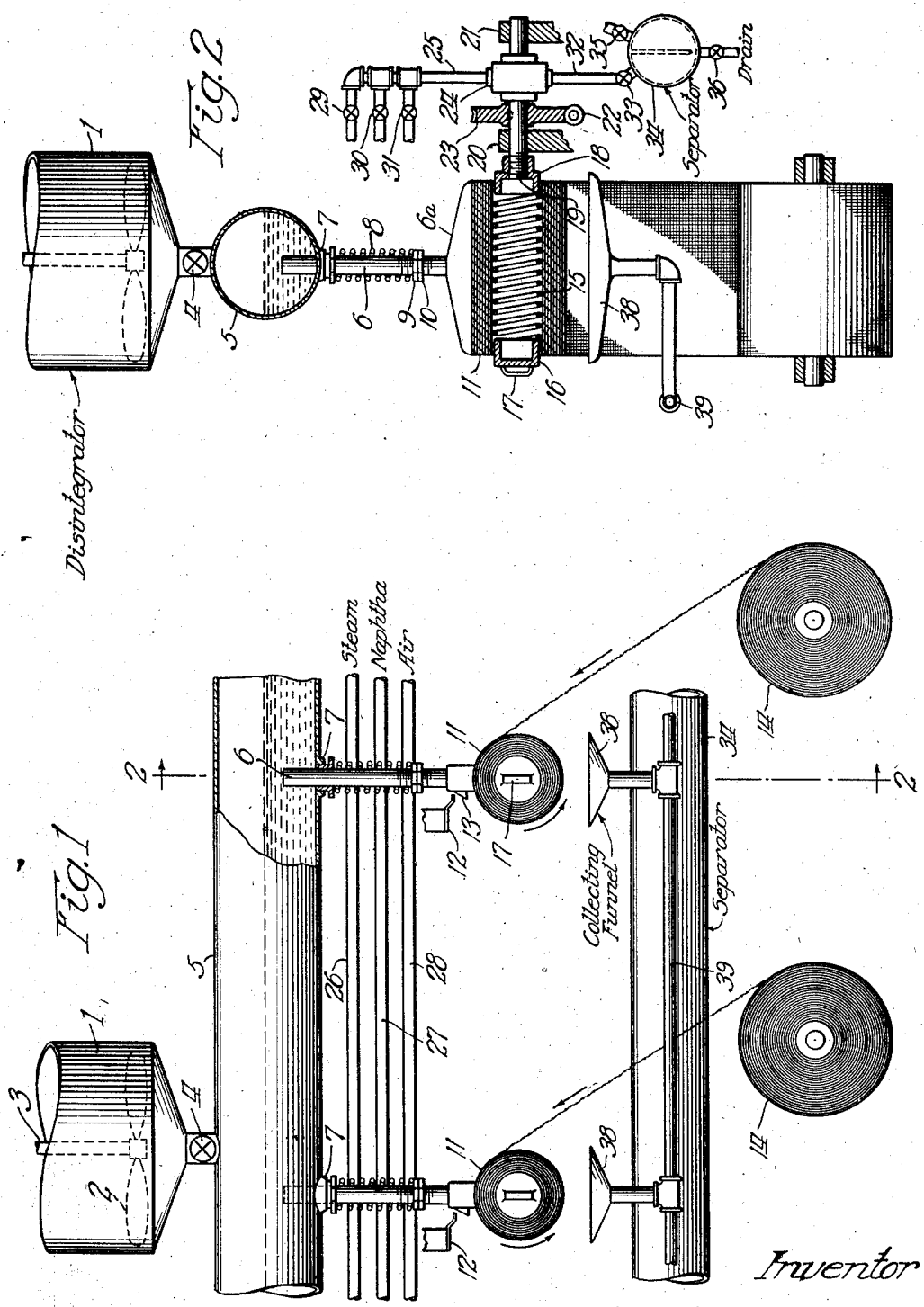
Inventor
Fred W Manning Patented Nov. 25, 1930

1,782,785

UNITED STATES PATENT OFFICE

FRED W. MANNING, OF BEVERLEY HILLS, CALIFORNIA, ASSIGNOR, BY MESNE ASSIGNMENTS, TO FILTER FABRICS, INC., OF BOSTON, MASSACHUSETTS, A CORPORATION OF MASSACHUSETTS

PROCESS OF MAKING FILTER PAPERS AND FILTER FABRICS

Application filed November 29, 1927, Serial No. 236,579. Renewed September 30, 1930.

This invention relates to improvements in filter papers and fabrics and includes not only a new article of manufacture, but also an improved method for producing filter papers and fabrics.

Heretofore, filter papers have been manufactured much the same as other kinds of papers in that the fibres are first disintegrated in water, the water containing the fibres passed through a Fourdrinier apron which retains the fibres in the form of a sheet from which the moisture is then removed by passing the sheet thus formed between or over squeezing and hot drying rolls. There are many objections to such methods. Cellulose fibres, from which filter papers are mostly made, have a considerable affinity for water and the cellulose is to a certain extent modified by soaking in pure water. This weak combination between cellulose and water, as indicated by swelling, seems to modify the surface tension of the water with the result that pure water wets cellulose fibres readily, and in fact more readily than do some liquids which have lower surface tension, but for which the cellulose does not have so great an attraction. This change in the physical condition, or modification in the chemical properties of the cellulose, results not only in shrinkage of the fibres or reduction in their porosity during dehydration, but the fibres mass or clot together in a condition usually termed "wild", which makes it impossible to obtain uniformity of clarity and filtering speed for the liquid passing through different portions of the paper. Furthermore the removal of water from the fibres by pressing or squeezing breaks down the heterogeneous structure of the fibres formed by the passage of the conveying liquid therethrough, which results in a further decrease in the porosity of the paper.

As distinguished from such prior methods the present invention includes the advantages of using a liquid as a fibre disintegrating and spacing agent, which has sufficiently high surface tension or low wetting power to maintain the fibres in a suitably spaced or dispersed condition during the sheet forming period, and upon removal by a suitable inert solvent, leaves the fibres in this spaced condition while they retain essentially their original physical and chemical condition. Or, if immediate use is to be made of the fibrous filter sheet, it may not be necessary to remove the spacing liquid soakage. Clotting or lumping of the fibres, when a small amount of the mixed liquid and fibres is squeezed between two thin sheets of paper, will indicate that the surface tension of the liquid is not sufficiently high to properly space the fibres for filtration purposes.

Further in accordance with this invention, in order to maintain through the filter paper a maximum filtering speed and maximum clarity of filtrate, the spacing liquid must not only be chemically inert and of sufficiently high surface tension to maintain the desired spacing between the fibres, but its surface tension must approximate as closely as possible the surface tension of the fluid to be filtered through the finished paper, so that the thickness of the spacing or fibre enveloping film may approximate in thickness a film of the liquid to be filtered. For example:—Mineral oil is chemically inert in its relation with cellulose fibres but it should have a viscosity at least equivalent to that of a good lubricating oil to have sufficiently high surface tension to maintain most cellulose fibres in a properly spaced relation during the sheet forming period. If the liquid to be filtered is an oil of still higher viscosity, then a similarly high viscosity oil should be used for spacing purposes, and if the liquid to be filtered is an oil of lower viscosity, then a fibre such as asbestos for which oil has a lower surface tension than it has for cellulose, may be mixed with the cellulose fibres in order that an oil of lower viscosity may be used for spacing purposes. If the viscosities of the oil used for spacing purposes and the oil to be filtered are the same, their surface tensions will likewise be the same, although the surface tensions of different liquids of the same viscosity may vary. Treating fluids such as a naphtha solvent may then be used to remove the oil soakage, traces of the naphtha may be removed by superheated steam without condensation, providing the previous operations have been carried out at sufficiently high temperature, and steam may be removed by air. Likewise, sugar liquor having a density over 60 Brix at 175° F. may be used satisfactorily to space most cellulose fibres, but as in the above cited instance, if the liquid to be filtered through the finished filter paper has a still higher surface tension, the density of the sugar concentration should be increased to make the surface tension of the two fluids correspond, and if the liquid to be filtered has a lower surface tension, asbestos fibres may be added to the cellulose fibres, in order that a lower Brix liquor may be used for spacing purposes. If the fluid to be filtered is a sugar liquor, then their surface tensions will have the same relative value as their Brix. In this case, there is probably a loose combination between the water and the sugar which restrains the normal properties of the water and prevents its combination with the cellulose. Other suitable dispersing and spacing liquids, chemically inert but having a high surface tension for cellulose fibres, may be used, such as glycerine, etc.

The cellulose fibres may be mixed with other treating solids such as a suitable amount of asbestos fibres to form a fibrous structure of greater compactness, and for the purpose of using a lower tension liquid for disintegrating and spacing purposes, and to the fibrous solids may be added granular treating solids such as decolorizing agents like fuller's earth, bone char, etc., and also copper sulphate, copper chloride, etc., or salts of other metals, for the removal of sulphur compounds, etc., contained in the fluids to be filtered. The fibres with or without additional treating solids may then be distributed uniformly over an open mesh fabric or other assemblage of threads of any suitable material but of greater tensile strength than the treating solids, by the passage therethrough of a suitable conveying fluid; or the treating solids may be distributed on a pervious flexible sheet one at a time by the passage therethrough of a suitable conveying fluid carrying the said treating solids, the finer solids being deposited or precipitated first. A solvent of the spacing fluid may then be passed through the fabric thus formed to remove the spacing fluid soakage, another fluid such as steam may be used to remove traces of the solvent, or for drying, and this in turn may be followed by air to prevent condensation of the steam, or for drying purposes.

Any suitable apparatus may be used for supporting the sheet of filter paper and allowing passage therethrough of the treating fluids for washing and drying purposes, such as described in my co-pending application, Serial No. 182,926, filed April 11, 1927, or in my copending application Serial No. 187,673, filed April 29, 1927 of which this application is a continuation in part. The apparatus described in the former application is equally applicable for the production of filter paper with or without reinforcing threads. If the apparatus described in the latter or this application is used, the paper may be stripped from the reinforcing threads or scrim after being formed.

The invention is exemplified in the following description, and one form of apparatus for carrying out the process is illustrated by way of example in the accompanying drawings, in which:

Figure 1 is a longitudinal elevation of the mechanism for forming the filter paper sheets on a thread backing.

Figure 2 is a transverse sectional view taken at the line 2—2 of Figure 1.

Referring more specifically to the drawings by reference characters:—Complete dispersion of the fibres is accomplished in a tank 1, in which a propeller 2 on the shaft 3 may be used for mixing the treating solids with the spacing liquid. The tank 1 is connected with a header 5 by a short pipe connection in which is located a valve 4 for controlling the delivery of the pulp from the tank to the header. The liquid is maintained at a predetermined level in the header by customary means not shown. Any desired number of pulp feeding tubes 6, are provided at intervals along the length of the header for cooperating with correspondingly situated foraminous sleeves upon which the fabric is to be wound as hereinafter described. Each pulp feeding tube 6 passes through a stuffing box 7 into the header 5 and is yieldingly retracted by a spring 8 for holding the mouth piece 6ª against the roll of scrim indicated at 11 which is wound on a radially expansible foraminous drum or sleeve 15. The tension of the spring 8 is regulated by an adjusting nut 9 which is maintained in position by a jam nut 10. The feeding tube, when not conveying pulp to the roll 11, is locked in its upper position, that is with the mouthpiece out of contact with the roll, by means of a spring dog, 12, engaging with a catch 13 which projects from the side of the feeding tube and when conveying pulp to the roll, the elongated mouthpiece 6ª rests on the top of the roll. The scrim or other thread structure comprising the roll 11 is conveyed from a reserve roll 14 and wound upon a coiled spring 15 which constitutes a radially contractible foraminous sleeve. The coiled spring is attached to and carried by end pieces 16 and 18, the end 16 having a handle 17 at the outer side and the end piece 18 being screwed onto a hollow shaft 19. The hollow shaft is supported on bearings 20 and 21 and is driven through a worm 22 and worm gear 23 by means not shown and is connected through a turning joint 24 and pipe 25 to the steam, wash and air lines 26, 27 and 28 respectively, controlled respectively by valves 29, 30 and 31. The hollow shaft is also connected through the turning joint 24 and pipe 32 controlled by valve 33 with the separator header 34, and the latter has a valve connection 35 to a vacuum pump not shown, and also a drain connection controlled by a valve indicated at 36. Funnels 38 connected to the header 39 are used to collect washing or other treating fluids after their passage through the filter fabric windings. If such treating fluid is in vapor form after its passage through the windings a cover may be placed over the filter rolls and attached to the funnels, and the vapors thus collected led away through the header 39 to a condenser.

The operation of the apparatus thus constructed, has been in part indicated in connection with the foregoing description. Cellulose fibres mixed with other fibrous treating solids such as asbestos fibres, etc., or granular treating solids such as bone char, etc., are introduced into the disintegrating tank where the particles are thoroughly agitated and dispersed in an inert liquid of sufficiently high surface tension to completely separate each fibre and when formed into a filter sheet, to space them at least the same extent as they would be if completely enveloped with a film of the fluid to be filtered. Such liquids as those above mentioned are suitable. The mixture after disintegration and dispersion of the fibres, is delivered through the valve 4 into the header 5, where it is maintained at a predetermined level by means not shown, and from the header it is passed through tube 6 for spreading by the mouthpiece 6ª on the scrim or other suitable assemblage of threads. This may be done with the mixture in a pulpy condition resulting from the use of a minimum quantity of dispersing liquid but generally a sufficient quantity of liquid will be introduced either into the tank 1 or into the header 5 to reduce the pulp to a more fluid condition. The end of the fabric from the reserve roll 14 is attached to the coiled spring 15 so as to be wound thereon by rotation of the sleeves and the feeding tube 6 being disengaged from catch 12 is allowed to descend until the ends of the mouthpiece rest upon the two end pieces 16 and 18 of the coil spring sleeve, the ends protruding slightly farther than the longitudinal lips of the mouthpiece so that the latter are spaced sufficiently from the foraminous sleeve 15 to permit the fabric from the roll 14 to pass freely under the lips, which thus serve as a means for spreading the pulp delivered through the mouthpiece evenly on the fabric as it is wound upon the sleeve. The valve 33 leading to the separator and valve 35 leading to the suction pump are now opened and the mechanism started for rotating the sleeve and winding thereon successive coils or layers of the fibre impregnated scrim for constituting the filtering fabric. By this method the fibres in the pulp mixture are carried and deposited uniformly in the scrim by the spacing liquid for the intended filtering purpose, and the excess liquid or soakage is withdrawn inwardly through the windings and foraminous sleeve, and delivered through the hollow shaft 19 into the separator 34. As the windings accumulate to the desired diameter of the roll, the feeding tube is raised by the accumulated layers until the spring dog 12 engages the catch 13, the cooperating parts being relatively positioned with respect to the governed pulp level in the header 5, so that the engagement of the dog with the catch and the arresting of the winding mechanism, occurs when the intake mouth of the tube 6 has been lifted to the governed level of the supply of liquid pulp. Valve 33 will then be closed cutting off the communication with the separator, and the remainder of the liquid in the windings will be removed by opening the valve connection 30 to the naphtha header and allowing the naphtha to flow readily outwardly through the windings into the collecting funnel, the solvent charged with the removed spacing liquid being carried away to the header 39. Similarly, when this step in the process is judged to be satisfactorily completed, the valve connection 30 to the solvent header is closed and the valve connection 29 to the steam header is opened thereby removing the naphtha soakage from the windings by steam. But in this case it will probably be desirable to completely enclose the filter roll in a cover attached to the funnel in order to prevent the escape of steam which will then be led through the funnels and collecting header to a condenser. The steam remaining in the windings may be removed in a similar manner by closing the valve connection 29 to the steam header and opening a valve connection 31 to the compressed air header. The filter roll may then be removed by gripping the handle 17 and turning it in the direction for slightly coiling somewhat more closely the spring coil 15, thereby contracting it out of engagement with the windings so that the latter may be readily removed longitudinally. If desired, the paper may be stripped from its backing before or after removal of the filter roll, and the backing then used over again to support and separate other sheets of filter paper.

The operation as above described may be performed with respect to each of the coils 11 and repeated with respect to each to the limit of the supply of the reinforcing scrim and fibrous pulp.

I claim:

1. In a method of preparing a filter paper, a step consisting of dispersing cellulose fibres in an inert liquid of sufficiently high surface tension to completely separate the fibres for filtration purposes.

2. In a method of preparing a filter paper, a step consisting of dispersing cellulose and asbestos fibres in an inert liquid of sufficiently high surface tension to completely separate the fibres for filtration purposes.

3. In a method of preparing a filter paper, a step consisting of dispersing cellulose fibres in an inert liquid of sufficiently high surface tension to completely separate the fibres for filtration purposes and of equivalent surface tension to the liquid to be filtered.

4. In a method of preparing a filter paper, steps consisting of dispersing cellulose fibres in an inert liquid of sufficiently high surface tension to completely separate the fibres for filtration purposes and precipitating the fibres in a uniformly spaced condition on a pervious structure by the passage of the liquid through the structure.

5. In a method of preparing a filter paper, steps consisting of dispersing cellulose fibres in an inert spacing liquid of sufficiently high surface tension to completely separate the fibres for filtration purposes, precipitating the fibres in a uniformly spaced condition on a pervious structure by the passage of the liquid through the structure, and thereafter removing the spacing liquid soakage by passing a solvent of the spacing liquid through the precipitated fibres.

6. In a method of preparing a filter paper, steps consisting of dispersing cellulose fibres in an inert spacing liquid of sufficiently high surface tension to completely separate the fibres for filtration purposes, precipitating the fibres in a uniformly spaced condition on a pervious structure by the passage of the liquid through the structure, and thereafter passing a drying fluid through the precipitated fibres.

7. In a method of preparing a filter paper, steps consisting of dispersing cellulose fibres in an inert spacing liquid of sufficiently high surface tension to completely separate the fibres for filtration purposes, precipitating the fibres in a uniformly spaced condition on a pervious structure by the passage of the liquid through the structure, thereafter removing the spacing liquid soakage by passing a solvent of the spacing liquid through the precipitated fibres, and thereafter removing the solvent soakage by passing a drying fluid through the precipitated fibres.

8. The process of preparing a filter fabric consisting of dispersing cellulose fibres in an inert spacing liquid of sufficiently high surface tension to completely separate the fibres for filtration purposes, and precipitating the fibres upon the surface of an assemblage of threads.

9. The process of preparing a filter fabric consisting of dispersing cellulose fibres in an inert spacing liquid of sufficiently high surface tension to completely separate the fibres for filtration purposes, and precipitating the fibres upon the surface of an assemblage of threads by a differential of pressure on opposite sides of the assemblage of threads, whereby a portion of the spacing liquid is eliminated in the process of occupying the openings between the threads with fibres.

10. That improvement in processes of making filter fabrics which consists in dispersing finely divided filter material in a spacing liquid of sufficiently high surface tension to maintain the particles of said material separated from each other, and passing said liquid through a moving web of material and thereby precipitating said solid material in an approximately evenly distributed condition on said web.

11. That improvement in processes of making filter fabrics which consists in dispersing fibrous material in a liquid of sufficiently high surface tension to keep the fibres in a separated condition, and precipitating said fibres on a moving web of loosely fabricated sheet material by passing said liquid through said moving web.

12. In a method of preparing paper filtering fabric, a step consisting in forcing a fibrous substance suspended in oil into a supporting fabric by differential pressures applied at opposite sides of the fabric whereby the liquid element carries the fibre element into the meshes of the fabric and the liquid is in part eliminated in the process of occupying the meshes of the fabric with the fibre.

13. The process of preparing paper filter fabric consisting of dispersing a fibrous substance in a spacing oil; spreading the oil and fibre mixture upon the surface of an open web fabric; and causing the oil to carry the fibre into the meshes of the fabric by differential pressures exerted upon opposite sides of the fabric.

14. A process of preparing a filter fabric comprising dispersing a fibrous material in an oil having sufficient viscosity to maintain the fibres in spaced relation, and forcing said fibrous material into a supporting fabric by passing the oil through the fabric.

15. That improvement in methods of making filter fabrics which consists in dispersing a finely divided fibrous material in oil and thereby producing a fluid mixture, flowing said mixture into contact with a moving web of fabric under conditions which cause the oil to pass through the fabric and to deposit the fibrous material in the meshes of the fabric, and distributing such flow substantially uniformly over approximately the entire width of said web.

16. That improvement in methods of making filter fabrics which consists in dispersing a finely divided fibrous material in oil and thereby producing a fluid mixture, flowing said mixture into contact with the outer surface of a roll of open mesh fabric under conditions which cause the oil to pass through the fabric and to deposit the fibre in the meshes of the fabric, unwinding said fabric continuously from said roll during the operation of depositing said fibre thereon, and so distributing the flow of said mixture that a substantially uniform coating of fibrous material will be applied to the surface of said fabric.

17. That improvement in methods of making filter fabrics which consists in dispersing finely divided fibrous and non-fibrous filter materials in oil and thereby producing a fluid mixture, flowing said mixture into contact with a continuously moving web of open mesh fabric under such conditions as to cause the oil to pass through the fabric and to deposit said filter materials in the meshes of the fabric, and so distributing such flow as to coat the fabric substantially uniformly with said filter materials.

In testimony whereof, I affix my signature.

FRED W. MANNING.